(12) United States Patent
Madison et al.

(10) Patent No.: US 10,977,956 B1
(45) Date of Patent: Apr. 13, 2021

(54) SYSTEMS AND METHODS FOR VIRTUAL REALITY BASED DRIVER TRAINING

(71) Applicant: STATE FARM MUTUAL AUTOMOBILE INSURANCE COMPANY, Bloomington, IL (US)

(72) Inventors: Anna Marie Madison, Morton, IL (US); Yixiang Zeng, Urbana, IL (US); Jeffrey Yin, Fresh Meadows, NY (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 333 days.

(21) Appl. No.: 15/340,646

(22) Filed: Nov. 1, 2016

(51) Int. Cl.
| | |
|---|---|
| *G09B 9/05* | (2006.01) |
| *G09B 9/052* | (2006.01) |
| *A63F 13/803* | (2014.01) |
| *A63F 13/53* | (2014.01) |
| *A63F 13/30* | (2014.01) |
| *A63F 13/212* | (2014.01) |
| *A63F 13/46* | (2014.01) |

(52) U.S. Cl.
CPC .............. *G09B 9/05* (2013.01); *A63F 13/212* (2014.09); *A63F 13/30* (2014.09); *A63F 13/46* (2014.09); *A63F 13/53* (2014.09); *A63F 13/803* (2014.09); *G09B 9/052* (2013.01); *A63F 2300/8082* (2013.01)

(58) Field of Classification Search
CPC .. G06F 3/012; G09B 9/02; G09B 9/04; G09B 9/05; G09B 9/052; G09B 9/302; G09B 19/14; G09B 19/167
See application file for complete search history.

(56) References Cited

U.S. PATENT DOCUMENTS

| | | | | |
|---|---|---|---|---|
| 3,898,746 A | * | 8/1975 | Seidle .................... | G09B 9/05 434/69 |
| 5,269,687 A | * | 12/1993 | Mott ...................... | A63F 13/10 273/454 |
| 5,354,202 A | * | 10/1994 | Moncrief ............... | A63F 13/10 273/454 |
| 5,577,913 A | * | 11/1996 | Moncrief ............... | A63F 13/10 273/454 |
| 6,763,325 B1 | * | 7/2004 | Stone .................. | G06F 17/5009 434/14 |
| 7,565,230 B2 | * | 7/2009 | Gardner ............... | G07C 5/0808 180/272 |

(Continued)

*Primary Examiner* — Robert J Utama
(74) *Attorney, Agent, or Firm* — Marshall, Gerstein & Borun LLP

(57) ABSTRACT

Systems and methods for providing driver training in a virtual reality environment are disclosed. According to some aspects, an appropriate virtual reality driving simulation may be determined based on one or more input parameters provided by a user. The virtual reality driving simulation may include: (i) an instructional lesson, to be rendered in virtual reality, for teaching driving-related rules and/or skills to a user, and (ii) a driving scenario, to be rendered in virtual reality, for the user to practice the driving-related rules and/or skills taught by the instructional lesson. While the virtual reality driving simulation is rendered, user performance data may be recorded. Based on an analysis of the user performance data, a driving competency score and/or user feedback may be determined.

20 Claims, 6 Drawing Sheets

(56) References Cited

U.S. PATENT DOCUMENTS

| | | | | |
|---|---|---|---|---|
| 8,297,977 B2* | 10/2012 | Freund | ............... | G09B 19/167 |
| | | | | 434/62 |
| 9,349,300 B2* | 5/2016 | Harkness | ............... | G09B 9/05 |
| 9,583,017 B2* | 2/2017 | Nepomuceno | ......... | G06Q 40/08 |
| 10,242,500 B2* | 3/2019 | Tommy | ................. | G06T 15/00 |
| 10,475,350 B1* | 11/2019 | Nepomuceno | ........... | G09B 9/05 |
| 2004/0158476 A1* | 8/2004 | Blessinger | ........... | G06Q 50/205 |
| | | | | 434/65 |
| 2006/0040239 A1* | 2/2006 | Cummins | ............... | G09B 9/05 |
| | | | | 434/62 |
| 2007/0268158 A1* | 11/2007 | Gunderson | ........... | G06Q 40/08 |
| | | | | 340/933 |
| 2008/0254417 A1* | 10/2008 | Mohamed | ............... | G09B 9/04 |
| | | | | 434/69 |
| 2012/0295230 A1* | 11/2012 | Esposito | ................ | G09B 9/04 |
| | | | | 434/69 |
| 2014/0220513 A1* | 8/2014 | Harkness | ............... | G09B 9/05 |
| | | | | 434/69 |
| 2015/0050623 A1* | 2/2015 | Falash | ..................... | G09B 9/24 |
| | | | | 434/38 |
| 2015/0104757 A1* | 4/2015 | Moncrief | .............. | G09B 9/302 |
| | | | | 434/38 |
| 2015/0187224 A1* | 7/2015 | Moncrief | ............. | G09B 9/052 |
| | | | | 434/30 |
| 2016/0232802 A1* | 8/2016 | Nomura | ............... | B60W 40/09 |
| 2016/0293037 A1* | 10/2016 | Jacques | ................... | G09B 9/02 |
| 2016/0293049 A1* | 10/2016 | Monahan | ............ | G09B 19/167 |
| 2017/0273552 A1* | 9/2017 | Leung | ..................... | A61B 3/02 |
| 2018/0059779 A1* | 3/2018 | Sisbot | .................... | G06F 3/013 |

* cited by examiner

SYSTEMS AND METHODS FOR VIRTUAL REALITY BASED DRIVER TRAINING

FIELD OF DISCLOSURE

The present disclosure generally relates to systems and methods for training drivers, and, more particularly, to training drivers in an environment that simulates real-life driving conditions.

BACKGROUND

Drivers typically are required to complete one or more training courses to obtain a license for operating a vehicle and/or qualify for insurance coverage and discounts, among other reasons. Even licensed drivers are sometimes required to take refresher courses, for example, as the result of receiving a moving violation.

Conventional driver training programs typically have a two-part format. First, a student will learn the driving rules (e.g., the rules of the road) and other driving-related skills in a classroom setting or through written materials. Later, the student will take an on-road driving test with an instructor, where the student is required to demonstrate the skills she previously learned in the classroom. Several days, or even weeks, may separate the classroom training and the on-road driving test. This gap between learning the driving skills and putting them into practice results in an inefficient, and potentially incomplete, knowledge transfer. Furthermore, significant costs may be involved with hiring an instructor and purchasing and maintaining a practice vehicle. Consequently, the amount of time available for the student to practice with the instructor under real-life conditions may be limited. It may not be feasible, for example, to practice higher order skills (e.g., hazard anticipation, situational awareness, distraction mitigation, etc.) with the instructor due to time constraints. Additionally, certain driving scenarios may be difficult or even dangerous to replicate during the on-road test. Thus, the student may not be exposed to a diverse set of driving scenarios. For these reasons, and others, conventional driver training programs are often ineffective, particularly in regards to reducing crash risks for young drivers.

Simulators have been developed for training driving students. However, existing simulators are not effective in replicating real-life driving conditions, in part because they typically employ a freestanding video monitor positioned several feet from the student. As a result, the video monitor will not fill the student's field of view, especially when the student turns her head. Moreover, existing simulators tend to be bulky and relatively expensive, making their availability scarce and/or limited to a centralized teaching location (e.g., a driving school).

The present disclosure sets forth systems and methods for training drivers, embodying advantageous alternatives to existing driver training systems and methods, and that may address one or more of the challenges or needs mentioned herein, as well as provide other benefits and advantages.

SUMMARY

One aspect of the present disclosure provides a computer-implemented method for driver training. The method may include receiving, via a computer network, at least one input parameter corresponding to at least one feature to be rendered during a virtual reality driving simulation. Additionally, the method may include determining, by one or more processors, an appropriate virtual reality driving simulation based on the at least one input parameter, wherein the virtual reality driving simulation comprises: (i) an instructional lesson, to be rendered in virtual reality, for teaching driving-related rules and/or skills to a user, and (ii) a driving scenario, to be rendered in virtual reality, for the user to practice the driving-related rules and/or skills taught by the instructional lesson. In addition, the method may include transmitting, via the computer network, the virtual reality driving simulation for execution on at least one head-mounted virtual reality device. Further, the method may include receiving, via the computer network, user performance data recorded during execution of the virtual reality driving simulation. Also, the method may include analyzing, by one or more processors, the user performance data to determine a driving competency score, wherein the driving competency score measures user compliance with the driving-related rules and/or skills during the driving scenario of the virtual reality driving simulation.

Another aspect of the present disclosure provides computer-implemented method for driver training. The method may include receiving, via one or more client devices, at least one input parameter corresponding to at least one feature to be rendered during a virtual reality driving simulation, wherein the one or more client devices includes a head-mounted virtual reality device. Additionally, the method may include transmitting, via a computer network, the at least one input parameter. In addition, the method may include receiving, via the computer network, a particular virtual reality driving simulation based on the at least one input parameter. Furthermore, the method may include executing, via the one or more client devices, the virtual reality driving simulation such that the head-mounted virtual reality device renders at least: (i) an instructional lesson for teaching driving-related rules and/or skills to a user, and (ii) a driving scenario for the user to practice the driving-related rules and/or skills taught by the instructional lesson. Still further, the method may include recording, via the one or more client devices, user performance data during execution of the virtual reality driving simulation.

Yet another aspect of the present disclosure provides a system for driver training. The system may include one or more processors, a head-mounted virtual reality display device, and a non-transitory computer-readable medium storing instructions. When executed by the one or more processors, the instructions may cause the system to: (A) receive at least one input parameter corresponding to at least one feature to be rendered during a virtual reality driving simulation; (B) transmit the at least one input parameter; (C) receive a particular virtual reality driving simulation based on the at least one input parameter; (D) execute the virtual reality driving simulation such that the head-mounted virtual reality device renders at least: (i) an instructional lesson for teaching driving-related rules and/or skills to the user, and (ii) a driving scenario for the user to practice the driving-related rules and/or skills taught by the instructional lesson; and (E) record user performance data during execution of the virtual reality driving simulation.

BRIEF DESCRIPTION OF THE DRAWINGS

It is believed that the disclosure will be more fully understood from the following description taken in conjunction with the accompanying drawings. Some of the drawings may have been simplified by the omission of selected elements for the purpose of more clearly showing other elements. Such omissions of elements in some drawings are

DETAILED DESCRIPTION

The systems and methods disclosed herein generally relate to providing driver training in an environment that simulates real-life driving conditions. The presently disclosed systems and methods may utilize a head-mounted virtual reality device to increase fidelity of the simulation, thereby providing the user with a more realistic experience. Furthermore, the systems and methods disclosed herein may allow the user to practice driving-related rules and/or skills in the same environment in which she learns those rules and/or skills. Accordingly, the same cognitive mechanisms and behavior elicited in the learning environment may be employed by the user in the practice environment. This aspect of the driver training helps improve knowledge transfer and skill acquisition. Additionally, the presently disclosed systems and methods may provide the user with an opportunity to practice driving-related rules and skills shortly, or immediately, after she has learned those rules and skills. The brief or non-existent gap between learning and practice has been found to improve knowledge transfer and skill acquisition. Additionally, the presently disclosed systems and methods may provide the ability to record user performance data during the practice portion of the simulation and subsequently assess user compliance with the driving-related rules and skills based on the user performance data. Accordingly, the presently disclosed systems and methods may dynamically and automatically adapt the simulation to reflect the user's progress in learning and acquiring proficiency with the driving-related rules and/or skills. Additionally, the presently disclosed systems and methods may be configured to simulate hazardous driving scenarios that would otherwise be too dangerous to practice in real life, thereby providing the user with an opportunity to practice and hone skills critical for avoiding a driving accidents and crashes. In addition, the relatively low cost and mobility of a head-mounted virtual reality device facilitates its implementation in a wide variety of settings, and reduces or eliminates the need for conventional centralized driver training schools. Additionally, the presently disclosed systems and methods can utilize computer networks for collecting, compiling, analyzing, and/or communicating data related to the driving simulation, which can reduce the data processing burden on front-end components such as the head-mounted virtual reality device, leverage distributed computing capabilities, and/or provide the ability to update the driving simulation in response to real-time user performance data and/or background information on the user stored in remote databases. Accordingly, the presently disclosed systems and methods are directed to an improvement to computer functionality, and improve the functioning of conventional computers.

I. Example System for Driver Training

Figure 1:
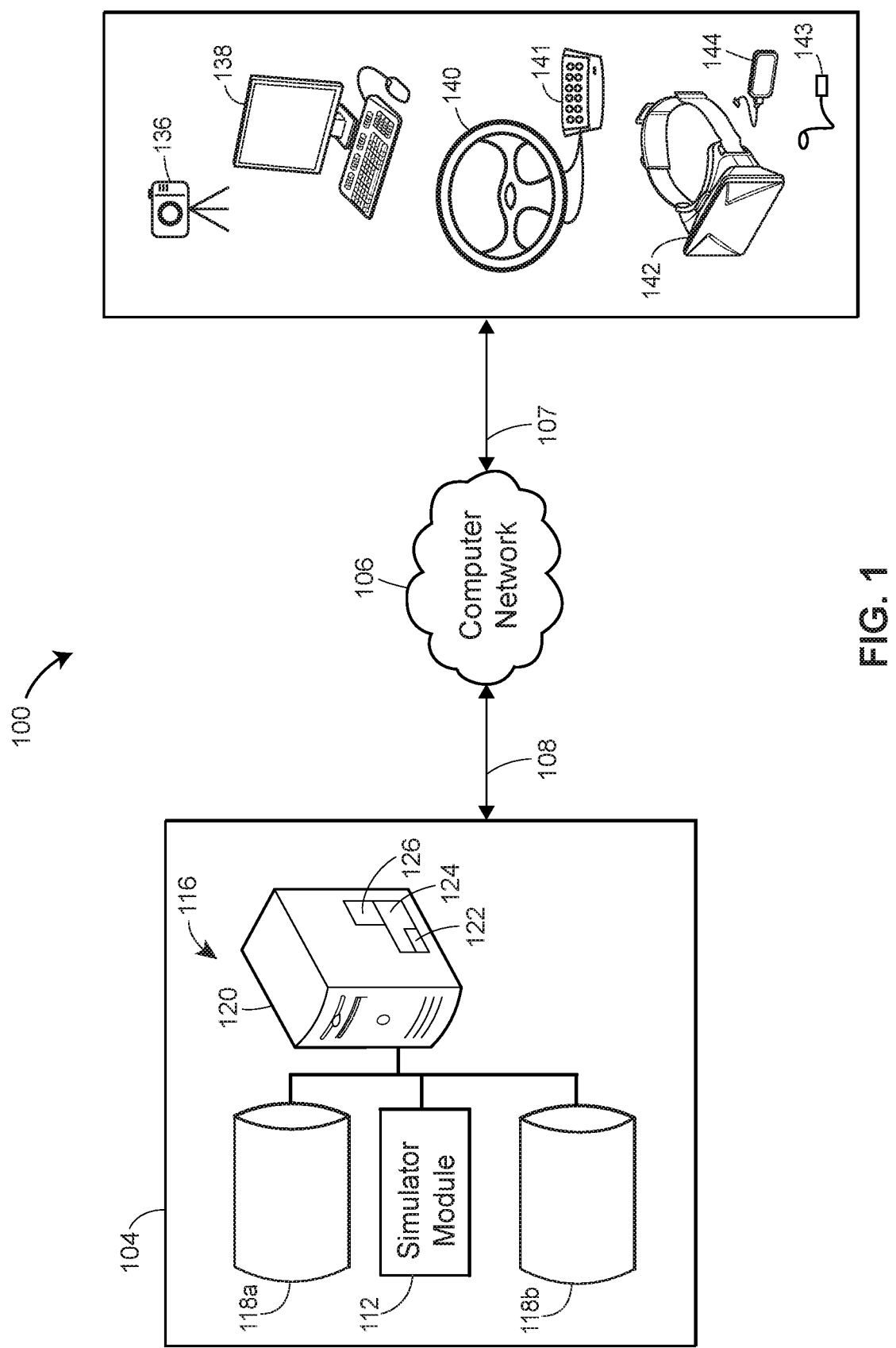
FIG. 1 is a block diagram illustrating one embodiment of a system for driver training in accordance with principles of the present disclosure.

FIG. 1 is a block diagram depicting an embodiment of a system 100 for virtual reality based driver training in accordance with principles of the present disclosure. Although FIG. 1 depicts certain devices and components, it will be appreciated that additional or alternative devices and components are envisioned.

The system 100 may include various software, computer-readable instructions, hardware components, and/or modules that may employ the software and/or computer-readable instructions to implement a virtual reality driving simulation. The various modules may be implemented as computer-readable storage memories containing computer-readable instructions for execution by one or more processors of the system 100. The modules may perform various tasks associated with a virtual reality driving simulator, as described in more detail below. The system 100 may also include both hardware and software applications, as well as various data communications channels for communicating data between the various hardware and software components.

More particularly, the system 100 may include client devices 136, 138, 140, 141, 142, 143, and/or 144 as front-end components and back-end components 104 in communication with each other via a computer network 106. The computer network 106 may facilitate data communications in accordance with any suitable number and type of compatible communication protocols. Accordingly, links 107 and 108 may represent wired links, wireless links, or any suitable combination thereof. For example, the computer network 106 may include one or more telecommunication networks, nodes, and/or links used to facilitate data transfers, and may facilitate a connection to the Internet for devices connected thereto. The computer network 106 may include any suitable number and type of interconnected network components that form an aggregate network system, such as the Internet, a wireless telephony network (e.g., GSM, CDMA, LTE, etc.), a Wi-Fi network (e.g., via one or more IEEE 802.11 Standards), a WiMAX network, a proprietary network, a secure public internet, a mobile-based network, a private network, a virtual private network, a peer-to-peer network, a file sharing network, dedicated access lines, plain ordinary telephone lines, satellite links, cellular base stations, public switched telephone networks (PSTN), a local area network (LAN), a metropolitan area network (MAN), a wide area network (WAN), or any suitable combination thereof. In an embodiment where the computer network 106 comprises the Internet, data communication may take place over the computer network 106 via an Internet communication protocol.

The client devices 136-144 may include, by way of example, a head-tracking unit (HTU) 136 (e.g., a digital camera, webcam, smart-phone, laptop computer, portable media player, wearable computing device, etc.), a computer 138 (e.g., a desktop computer, laptop computer, tablet computer, smartphone, gaming-class PC, Xbox® gaming console, PlayStation® gaming console, etc.), a steering wheel 140 (e.g., a gaming steering wheel), pedals 141 (e.g., gaming pedals), a Virtual Reality (VR) device 142 (e.g., Oculus Rift®, Google Cardboard®, HTC Vive®, Samsung Gear VR®, Sony PlayStation VR®, Microsoft HoloLens®, etc.), a physiological sensor (e.g., a heart rate monitor, breathing sensor, etc.), and a motion-sensing (MS) device 144 mounted directly on the VR device 142 (e.g., a Leap Motion® device, etc.). It is noted that any mobile device (e.g., a smartphone, smartwatch, personal digital assistant (PDA), etc.) appropriately configured may interact with the system 100 as an additional client device or as one or more of the client devices 136-144.

The HTU 136 may be configured as a standalone device or can be installed as part of the computer 138. In various embodiments the HTU 136 can be any one of a motion sensing device (e.g., a Microsoft® Kinect 2), web-cam, smartphone, tablet, digital camera, structured light system, etc. The HTU 136 may be configured to communicate with other devices in the system 100 through wireless and/or wired connections. The HTU 136 may be configured to detect and record data representative of the movement of the head of the user during a driving simulation. In addition to, or as an alternative to, tracking the head movement of the user during the driving simulation, the HTU 136 may be configured to detect and record data representative of movement of one or more arms of the user during the driving simulation, movement of one or more hands of the user during the driving simulation, movement of a torso of the user during the driving simulation, or any combination thereof. The recorded movement data may be stored by the HTU 136 and/or transmitted by the HTU 136 to be stored elsewhere, including, for example, in databases 118a and/or 118b.

In some embodiments, the computer 138 may be a desktop computer or a laptop computer. The driving simulator system 100 may require the computer 138 to include performance-oriented components such as a high-end CPU and/or one or more video cards. The performance-oriented features may be necessary to avoid latency in the driving simulations, which can lead to latency-related simulator sickness. The features that may be required for the computer 138 can be these commonly associated with a "gaming-class PC." In some embodiments, the computer 138 may be a gaming console such as a more recent generation of the Xbox® gaming console or the PlayStation® gaming console. The computer 138 may be able to communicate with the other client devices 136, 140, 141, 142, 143, and/or 144 and/or the backend components 104. The computer 138 may also include a graphical user interface (GUI) 110 and/or may be installed with a simulator module 112. In some embodiments, the GUI 110 may rendered by the VR device 142.

The computer 138 may be configured for inputting various input parameters necessary for implementing the driving simulation. The input parameters may include a username and password provided by a user upon log-in to associate driving competency assessments to a user profile. Alternatively, or additionally, the input parameters may specify various aspects of the simulation to be rendered by the driving simulator. The input parameters may also be received via the other client devices 136, 140, 141, 142, 143, and/or 144.

The steering wheel 140 and pedals 141 may be configured to receive the user's input during a simulation. In some embodiments, the steering wheel 140 and/or pedals 141 may be commonly available gaming hardware such as the Logitech® G27 Racing Wheel. The steering wheel 140 and/or pedals 141 may include a wired connection (e.g., HDMI, USB, etc.) and/or wireless connection to the computer 138 and/or the other client devices 136, 142, 143, and/or 144.

The VR device 142 may be a head-mounted device configured to render a virtual reality environment for the user. The VR device 142 may include a stereoscopic display configured to convey depth perception (i.e., three dimensionality (3-D)) to the user and provide a 360 degree field of view, head tracking sensors (e.g., gyroscopes, accelerometers, structured light systems, etc.), eye tracking sensors, and/or stereo speakers. In some embodiments, the stereoscopic display may incorporate a low latency liquid crystal display (LCD) screen. The VR device 142 may include a wired connection (e.g., HDMI, USB, etc.) and/or wireless connection to the computer 138 and/or the other client devices 136, 140, 141, 143, and/or 144. In some embodiments, the VR device 142 may incorporate a commercially available VR device including, but not limited to, the Oculus Rift®, Google Cardboard®, HTC Vive®, Samsung Gear VR®, Sony PlayStation VR®, and/or Microsoft HoloLens®.

The VR device 142 may be used to display the driving simulation. The 3-D and/or 360-degree-field-of-view display capabilities of the VR device 142 may advantageously provide an immersive and realistic driving simulation for the user. Additionally, the VR device 142 may be used to collect and record user performance data (e.g., the head movement of the user) for use in a driving performance assessment, as described below.

The physiological sensor 143 may be configured to detect and record data representative of one or more physiological characteristics of the user during the driving simulation. Such characteristics include, but are not limited to, the heart rate of the user, the breathing rate of the user, the body temperature of the user, the blood pressure of the user, or any suitable combination thereof. Such data may be used to evaluate, for example, the alertness, stress level, and/or temperament of the user during the simulation.

The MS device 144 may be configured to record (e.g., detect) data representative of one or more of the movement of the head of the user during the driving simulation, movement of one or more eyes of the user during the driving simulation, movement of one or more arms of the user during the driving simulation, movement of one or more hands of the user during the driving simulation, movement of a torso of the user during the driving simulation, or any combination thereof. In some embodiments, the MS device 144 may be configured to detect the user's hand position and hand movements, so that they can be re-created in the virtual reality driving simulation displayed by the VR device 142, thereby improving the immersive nature and realism of the simulation. Secondary tasks such as interacting with a cell phone, navigation device, or other in-vehicle infotainment systems may also be simulated inside the VR device 142 with this technique. The MS device 144 could be configured with various sensors for detecting movement including, but not limited to, a gyroscope, accelerometer, structured light system, or any combination thereof. In some embodiments, the MS device 144 may be built-into the VR device 142; whereas in other embodiments, the MS device 144 may be separate from the VR device 142.

Each of the client devices 136-144 may interact with a data system 116 to receive, via the computer network 106, simulation data and/or server data from a server 120, and may display the simulation data and/or server data via a client application and/or an Internet browser. For example, the desktop computer 138 may display a simulator menu and/or a performance assessment on a client application and/or through a web page to a user, may receive an input parameter from the user, and/or may interact with the data system 116. It will be appreciated that although only one server 120 is depicted in FIG. 1, multiple servers may be provided for the purpose of distributing server load, serving different web pages, etc. These multiple servers may include a web server, an entity-specific server (e.g., an Apple® server, a server operated by an insurance company, etc.), a server that is disposed in a retail and/or proprietary network, etc. In some embodiments, the server 120 may provide the functionalities of a cloud-based computing system.

The simulator module 112 may retrieve data from the databases 118a and/or 118b. The databases 118a and/or 118b may be maintained by, for example, an insurance provider. In some embodiments, the database 118a may store data and/or instructions for rendering the driving simulation (e.g., graphics, teaching instructions, audio files, menus, etc.) and the database 118b may store information relating to a driver profile including, but not limited to, driver identification information (e.g., a name, address, social security number, etc.), past and/or present insurance policies, incident reports, moving violations, etc. The simulator module 112 may also be implemented to receive data through one or more of the client devices 136-144 to be stored in databases 118a and/or 118b.

The server 120 may send and/or receive information from the databases 118a and/or 118b, such as computer-readable instructions and/or data associated with applications (e.g., the simulator module 112) executing on one or more of the client devices 136-144. The applications executing within the system 100 may include cloud-based applications, web-based interfaces to the data system 116, software applications executing on the clients, and/or applications including instructions that are executed and/or stored within any component of the system 100. The applications, GUI 110, browser, and/or simulator module 112 may be stored in various locations including separate repositories and/or physical locations.

In some embodiments, computer-readable instructions 122 may be stored within one or more memories 124 (e.g., a RAM, a non-volatile memory such as a hard disk, a flash memory, a removable memory, a non-removable memory, etc.) of the server 120 and/or executed using one or more processors 126 included in the server 120. The computer-executable instructions 122 may be representative of the simulator module 112 and/or send instructions to one or more of the clients 136-144 to implement the GUI 110 for the simulator module 112 using a web browser application of a client. In some embodiments, the browser application, the GUI 110, the simulator module 112, and/or elements of the data system 116 may be implemented at least partially on the server 120 and/or clients 136-144. The data system 116 and/or processor 126 may execute the computer-readable instructions 122 to display the GUI 110 including the data 118a and/or 118b within a display of the clients 136-144 and/or server 120 (not shown). For simplicity, FIG. 1 illustrates the display of the GUI 110 via the computer 138, although this is not intended to limit the number and/or display locations of the GUI 110.

In some embodiments, the simulator module 112 may be a client application that may be implemented as a series of machine-readable instructions for performing the various tasks associated with implementing the driving simulation, as well as receiving information, displaying information, and/or transmitting information between devices 136-144 and/or the server 120.

In some embodiments, the simulator module 112 may be implemented as a stand-alone system and/or as a system wherein the front-end components 136-144 communicate with back-end components 104 as described herein. Additionally, the simulator module 112 may include computer-readable instructions for implementing a virtual reality driving simulation.

The simulator module 112 may include a native web browser, such as Apple's Safari®, Google Android™ mobile web browser, Microsoft Internet Explorer® for Mobile, Opera Mobile™, that may be implemented as a series of computer-readable instructions for receiving, interpreting, and/or displaying web page information from the server 120 and/or other back-end components 104 while also receiving inputs from the user. The simulator module 112 may include an embedded web browser that may be implemented as a series of computer-readable instructions for receiving, interpreting, and/or displaying web page information from the servers 120 and/or other back-end components 104 within client devices 136-144.

In some embodiments, the simulator module 112 may be an application that is installed on the client devices 136-144. For example, the simulator module 112 may be downloaded and/or installed to the computer 138 by the user. Additionally or alternatively, the simulator module 112 may include computer-readable instructions for implementing a user interface to allow a user to input commands and/or respond to prompts. For example, the simulator module 112 may allow a user to select clickable icons (e.g., through a touch screen interface) and/or enter information through text inputs. The simulator module 112 may further execute a particular simulation (based on the received inputs) via the computer 138 and further via the HTU 136, the VR device 142, the steering wheel 140, the pedals 141, the physiological sensor 143, and/or the MS device 144.

II. Example Methods for Driver Training

A. Simulation Creation And Assessment

Figure 2:
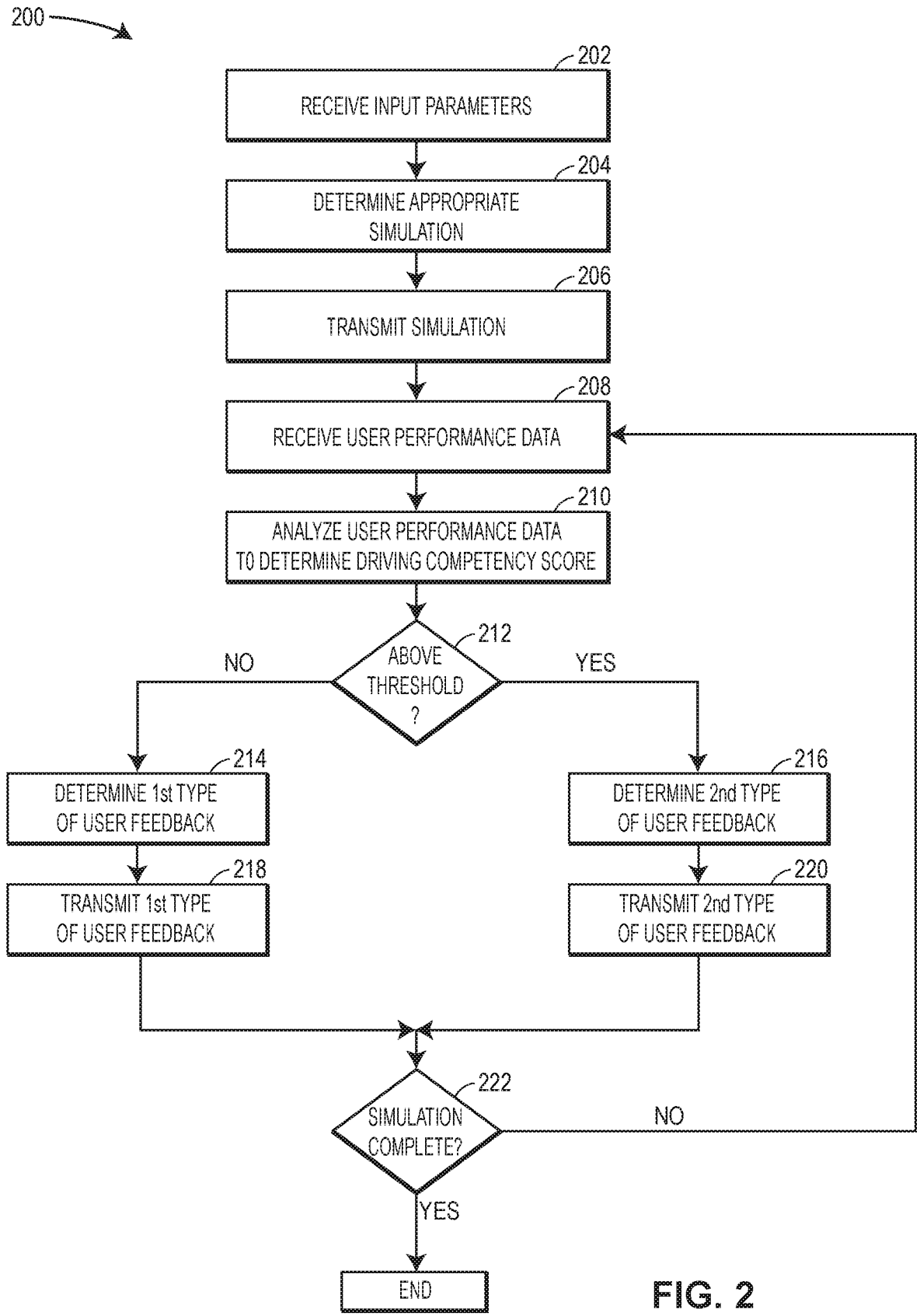
FIG. 2 is a flowchart depicting one embodiment of a method for creating a virtual reality driving simulation and assessing user performance in accordance with principles of the present disclosure.

FIG. 2 is a flow diagram of an example method 200 for creating a virtual reality driving simulation and assessing the performance of a user in the virtual reality driving simulation. In some embodiments, the example method 200 may be implemented, in whole or in part, by the server 120. In other embodiments, the example method 200 may be implemented by the server 120 in combination with one or more of the client devices 136-144, or by one or more of the client devices 136-144 alone. In some embodiments, the method 200 may be implemented, in whole or in part, by an application stored in a memory of a mobile telephone (e.g., a smartphone) which is configured as the computer 138 or tablet which is configured as the computer 138. Furthermore, in some embodiments, the method 200 may be saved, in whole or in part, as a set of computer-readable instructions, routines, programs, modules, and/or applications on one or more memories included in the server 120 and/or client devices 136-144.

The method 200 may begin with one or more components of the system 100 receiving input parameters (see FIG. 2 at block 202). In some embodiments, this step may involve the simulator module 112 causing the computer 138 to receive input parameters from the user. The input parameters may also be inputted by the user through one or more of the other client devices 136 and 140-144. In some embodiments, the input parameters may transmitted over the computer network 106 and received by the server 120.

In general, the input parameters may correspond to one or more features to be rendered during the virtual reality driving simulation. For example, the input parameters may include, but are not limited to, one or more of the following:

(1) Type of vehicle (e.g., a car, truck, motorcycle, plane, boat, watercraft, heavy machinery, forklift, etc.) to be rendered in the virtual reality driving simulation, including the make, year, and/or model of the vehicle;

(2) Type of road (e.g., city, rural, suburban, mountainous, off-road, etc.), including existing real-world streets or fictional computer-generated roads;

(3) Type of driving conditions or weather (e.g., nighttime, daytime, sunny, raining, snowing, sleeting, etc.)

(4) Type of driving obstacles or hazards (e.g., stop sign, vehicle in blind spot, lane departure of another vehicle, another vehicle running red light, etc.);

(5) User identification information (e.g., name, ID, password, age, gender, height, etc.);

(6) Type of driving-related rules and/or skills to be learned (e.g., stop sign training, blind spot training, merging with highway traffic training, hazard anticipation, situational awareness, distraction mitigation, emergency situations, etc.); and (7) Degree of difficulty of the virtual reality driving simulation (e.g., beginner, novice, expert, etc.).

In some embodiments, the input parameters may be used to correspond a user with a driver profile stored, for example, in the database 118b. As described below in more detail, a driving competency score assessed from a user's performance during the virtual reality driving simulation can be stored in the driver profile and used to make determinations corresponding to the user.

After the one or more input parameters have been received, the method 200 may involve determining an appropriate virtual reality driving simulation based on the one or more input parameters (see FIG. 2 at block 204). In some embodiments, the simulator module 112 may analyze the received input parameters and determine an appropriate virtual reality driving simulation. In some embodiments, the determination of the appropriate virtual reality driving simulation may be based solely on the input parameters; whereas in other embodiments, the determination of the virtual reality driving simulation may be based on the input parameters and other factors. For example, the simulator module 112 may automatically determine aspects of the virtual reality driving simulation that were not specified by input parameters provided by the user, such as the length of the virtual reality driving simulation. Furthermore, proprietary techniques can be used for determining the appropriate virtual reality driving simulation, including, for example, State Farm's Engaged Driver Training System, State Farm Road Trips, and State Farm Road Aware.

In some embodiments, the virtual reality driving simulation determined to be appropriate may include both: (i) an instructional lesson, to be rendered in virtual reality, for teaching driving-related rules and/or skills to the user, and (ii) a driving scenario, to be rendered in virtual reality, for the user to practice the driving-related rules and/or skills taught by the instructional lesson. As described in more detail below, when the virtual reality driving simulation is rendered by the VR device 142, the driving scenario may be rendered shortly, or immediately, after the instructional lesson has been rendered. For example, only a few seconds or minutes may separate the instructional lesson and the driving scenario during the virtual reality driving simulation. Accordingly, the driving-related rules and/or skills may be practiced by the user shortly or immediately after learning them, which can improve knowledge transfer and skill acquisition. Furthermore, the same general environment (i.e., a virtual reality environment) may be used for both the instructional lesson and the driving scenario, which, in some cases, may be pedagogically more effective than conventional driver training in which the student learns driving-related rules and/or skills in a classroom environment and subsequently practice these rules and/or skills in a different environment. Although the same general environment (i.e., a virtual reality environment) is used for the both the instructional lesson and the driving scenario in the present disclosure, the particulars of the driving scenario (e.g., traffic conditions, road conditions, vehicle type, etc.) may be varied relative to those demonstrated during the instructional lesson, so that the student can practice the driving-related rules and/or skills learned during the instructional lesson in a wide variety of driving scenarios. Having the student apply the newly learned driving-related rules and/or skills in a wide variety of driving scenarios may help improve knowledge transfer and skill acquisition.

In some embodiments, the driving scenario may involve rendering a virtual reality environment that is different from the one rendered during the instructional lesson. Accordingly, the user may be required to apply the driving-related rules and/or skills learned during the instructional lesson in a new context. This may have the benefit of reinforcing the driving-related rules and/or skills in the memory of the user. Furthermore, in some embodiments, multiple driving scenarios may be rendered for the user to practice the driving-related rules and/or skills, with one or more of the driving scenarios being the same as or similar to the virtual reality environment rendered during the instructional lesson, and with one or more of the driving scenarios being different from the virtual reality environment rendered during the instructional lesson.

Once an appropriate virtual reality driving simulation has been determined, the simulator module 112 may transmit the virtual reality driving simulation via the computer network 106 for execution by one or more of the client devices 136-144 (see FIG. 2 at block 206). In some embodiments, the simulator module 112 may transmit the virtual reality driving simulation to the computer 138, which in turn may cause one or more of the other client devices 136 and 140-144 to render the virtual reality driving simulation and/or record user performance data, as discussed below in connection with FIG. 3.

Subsequently, after the virtual reality driving simulation has been rendered, the simulator module 112 may receive the user performance data, via the computer network 106 (see FIG. 2 at block 208). As described below in more detail, the user performance data may be recorded via one or more of the client devices 136-144.

Next, the simulator module 112 may analyze the received user performance data to determine a driving competency score (see FIG. 2 at block 210). In some embodiments, the driving competency score may measure user compliance with the driving-related rules and/or skills during the driving scenario of the virtual reality driving simulation. In this way, the driving competency score may reflect how well the user complied with the driving-related rules and/or skills taught during the instructional lesson portion of the simulation when the user was required to practice those driving-related rules and/or skills during the driving scenario rendered by the simulation. In order to determine the driving competency score, the simulator module 112 may compare the user performance data with data stored in the database 118a and/or the database 118b, or data stored elsewhere.

In some embodiments, the simulator module 112 may implement various algorithms to analyze the user performance data to determine the driving competency score. For example, the simulator module 112 may receive a video of the user recorded during the driving scenario portion of the virtual reality driving simulation. The module 112 may then implement a video tracking algorithm to analyze various body movements of the user (e.g., head movements, arm movements, arm movements, torso movements, hand movements, etc.) during the virtual reality driving simulation to determine if the user reacted appropriately to the virtual reality driving simulation. Based on this analysis, the simulator module 112 may then determine an appropriate driving competency score.

In some embodiments, the simulator module 112 may receive user performance data based on the user's operation of controls (e.g., the user's operation of the steering wheel 140 and/or pedals 141) during the driving scenario portion of virtual reality driving simulation. The simulator module 112 may then implement an algorithm to analyze whether the user applied, for example, appropriate turning speed, acceleration, and/or deceleration during the driving scenario portion of the virtual reality driving simulation. The simulator module 112 may then determine a driving competency score based on this analysis.

In some embodiments, the simulator module 112 may analyze user performance data recorded by the VR device 142. For example, the VR device 142 may detect and record head and/or eye movements of the user. The simulator module 112 can determine if a user reacted appropriately throughout the driving scenario portion of the virtual reality driving simulation based on the user performance data recorded by the VR device 142. For example, the simulator module 112 may determine that the user's head was turned away from the road for an excessive amount of time at various times during the virtual reality driving simulation, and/or that the user was not looking at a particular road sign and/or road hazard at a particular time during the virtual reality driving simulation.

The driving competency score can take various forms. In some embodiments, the driving competency score can be a pass or fail grade. In other embodiments, the driving competency score can be a numbered grade, such as a score from 0-100. In further embodiments, the driving competency score can be a letter grade (e.g., a grade of A through F). In still further embodiments, the driving competency score may be a percentage based on the number of the drive-related rules and/or skills the user performed correctly during the virtual reality driving simulation.

After the driving competency score has been determined, the method 200 may involve comparing the driving competency score with a predetermined threshold (see FIG. 2 at block 212). For example, in an embodiment where the driving competence score is a letter grade, the predetermined threshold may be a letter grade of "C". In response to a determination that the driving competency score is above or equal to the predetermined threshold, the simulator module 112 may determine a first type of user feedback (see FIG. 2 at block 214). In response to a determination that the driving competency score is below the predetermined threshold, the simulator module 112 may determine a second type of user feedback (see FIG. 2 at block 216). After the first or second feedback has been determined, it may be transmitted via the computer network 106 for execution by one or more of the client devices 136-144 (see FIG. 2 at blocks 218 and 220). In some embodiments, the simulator module 112 may transmit the first or second user feedback to the computer 138, which in turn may cause one or more of the client devices 136 and 140-144 to communicate the first or second user feedback to the user, as discussed below in connection with FIG. 3.

In some embodiments, the first type of user feedback may include positive reinforcement for the user including, for example, praise and/or a reward (e.g., the ability to upgrade the make or model of the vehicle rendered by the virtual reality driving simulation). Additionally, or alternatively, the first type of user feedback may include both: (i) an updated instructional lesson, to be rendered in virtual reality, for teaching additional driving-related rules and/or skills to the user, and (ii) an updated driving scenario, to be rendered in virtual reality, for the user to practice the additional driving-related rules and/or skills taught by the updated instructional lesson. Accordingly, in some embodiments, the simulator module 112 may automatically adapt the virtual reality driving simulation so that the user does not necessarily have to repeat driving-related rules and/or skills for which the user has already become proficient. Accordingly, the user may proceed with learning and practicing higher-level driving-related rules and/or skills.

In some embodiments, the second type of user feedback may notify the user of their inadequate driving competency score and/or provide encouragement and/or tips for improving their score. Additionally, or alternatively, the second type of user feedback may include both: (i) an updated instructional lesson, to be rendered in virtual reality, for re-teaching the driving-related rules and/or skills to the user, and (ii) an updated driving scenario, to be rendered in virtual reality, for the user to practice the driving-related rules and/or skills taught by the updated instructional lesson. Accordingly, the simulator module 112 may automatically adapt the virtual reality driving simulation to ensure that the user acquires proficiency with various driving-related rules and/or skills before moving on to other driving-related rules and/or skills.

Next, the method 200 may involve determining whether the virtual reality driving simulation is complete (see FIG. 2 at block 222). If not, the method 200 may return to block 208 shown in FIG. 2, such that the simulator module 112 may receive additional user performance data, via the computer network 106, related the updated virtual reality driving simulation previously transmitted in the form of the first or second user feedback; and subsequently, the method 200 may repeat the steps represented by blocks 210-222 of FIG. 2.

B. Rendering a Simulation and Recording User Performance Data

Figure 3:
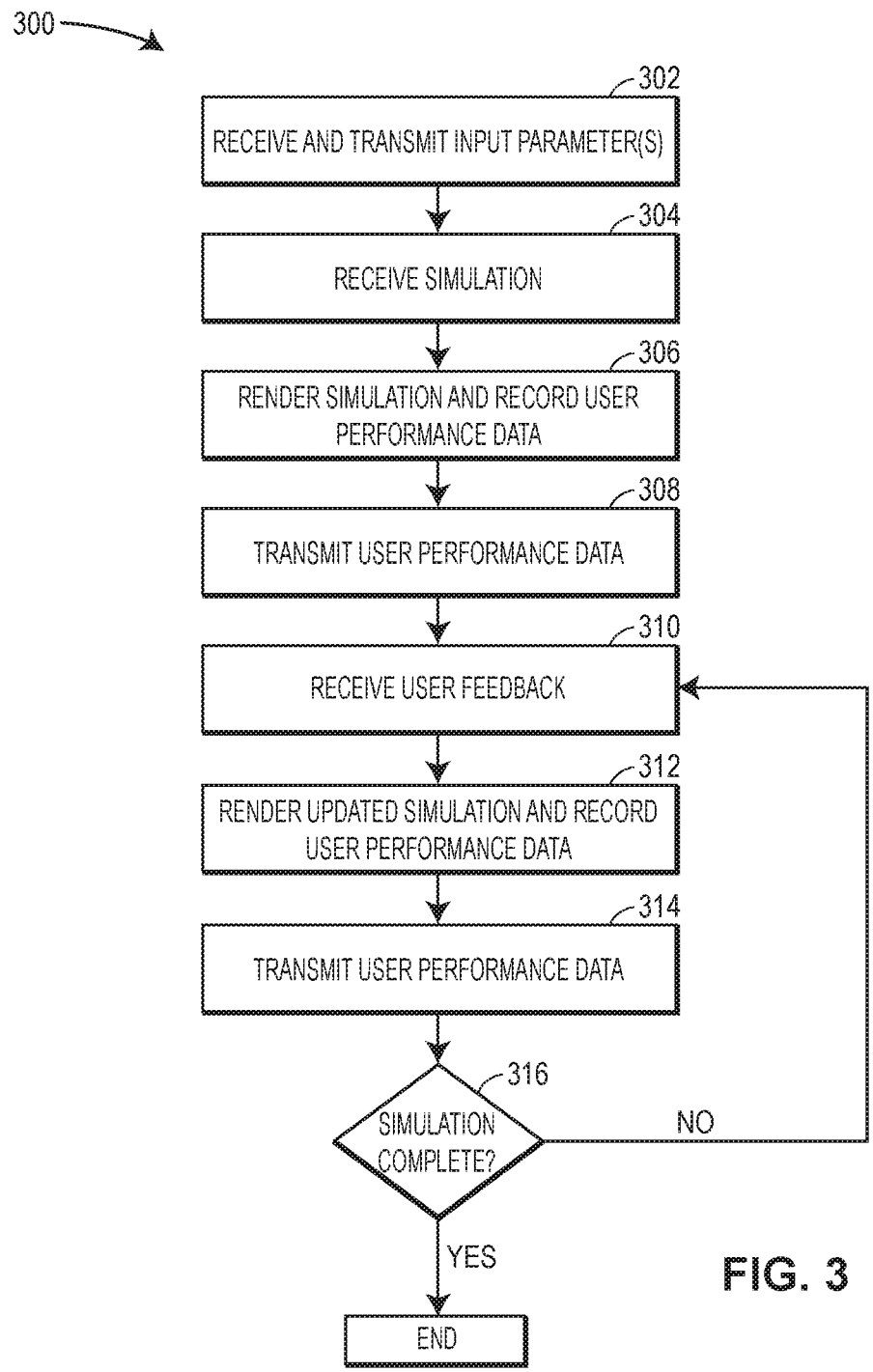
FIG. 3 is a flowchart depicting one embodiment of a method for rendering a virtual reality driving simulation and recording user performance data in accordance with principles of the present disclosure.

FIG. 3 is a flow diagram of an example method 300 for rendering a virtual reality driving simulation and recording user performance data. In some embodiments, the example method 300 may be implemented, in whole or in part, by one or more of the client devices 136-144. In some embodiments, the method 200 may be implemented, in whole or in part, by an application stored in a memory of a mobile telephone (e.g., a smartphone) which is configured as both the computer 138 and the VR device 142. Furthermore, in some embodiments, the method 300 may be saved, in whole or in part, as a set of computer-readable instructions, routines, programs, modules, and/or applications on one or more memories included in one or more of the client devices 136-144.

The method 300 may begin with one or more of the client devices 136-144 receiving one or more input parameters corresponding to one or more features to be rendered during the during the virtual reality driving simulation (see FIG. 3 at block 302). In some embodiments, the simulator module 112 may cause the computer 138 to receive the one or more input parameters from the user. After the one or more client devices 136-144 has received the one or more input parameters, the one or more input parameters may be transmitted, via the computer network 106, to the backend components 104. Examples of the input parameters are described above.

Subsequently, the computer 138 may receive, via the computer network 106, the virtual reality driving simulation (see FIG. 3 at block 304). The received virtual reality driving simulation may be the one transmitted by the backend components 104 at block 204 of the method 200 shown in FIG. 2.

Subsequently, the computer 138 may execute the virtual reality driving simulation such that the virtual reality driving simulation is rendered by one or more of the client devices 136-144 (see FIG. 3 at block 306). In some embodiments, rendering the virtual reality driving simulation may include, at least, displaying images on the stereoscopic display of the VR device 142 and/or emitting audio (e.g., spatial audio) through one or more speakers incorporated into the VR device 142. In some embodiments, the images and/or audio of the virtual reality driving simulation may include both: (i) an instructional lesson for teaching driving-related rules and/or skills to the user, and (ii) a driving scenario for the user to practice the driving-related rules and/or skills taught by the instructional lesson. The user may manipulate the steering wheel 140, pedals 141, and/or other controls when practicing the driving-related rules and/or skills during the driving scenario portion of the virtual reality driving simulation.

In some embodiments, the driving scenario may be rendered shortly, or immediately, after the instructional lesson is rendered. The time gap between the driving scenario and the instructional lesson may be equal to zero seconds, or equal to approximately (e.g., ±10%) 0-5 seconds, or equal to less than approximately (e.g., ±10%) 10 seconds, or less than approximately (e.g., ±10%) 30 seconds, or less than approximately (e.g., ±10%) 60 seconds, or less than approximately (e.g., ±10%) 120 seconds. Allowing the user to practice the driving-related rules and/or skills shortly after learning them improves knowledge transfer and/or skill acquisition. Additionally, providing the user with the opportunity to practice the driving-related rules and/or skills multiple times in potentially a wide variety of different driving scenarios also enhances knowledge transfer and/or skill acquisition.

Figure 4:
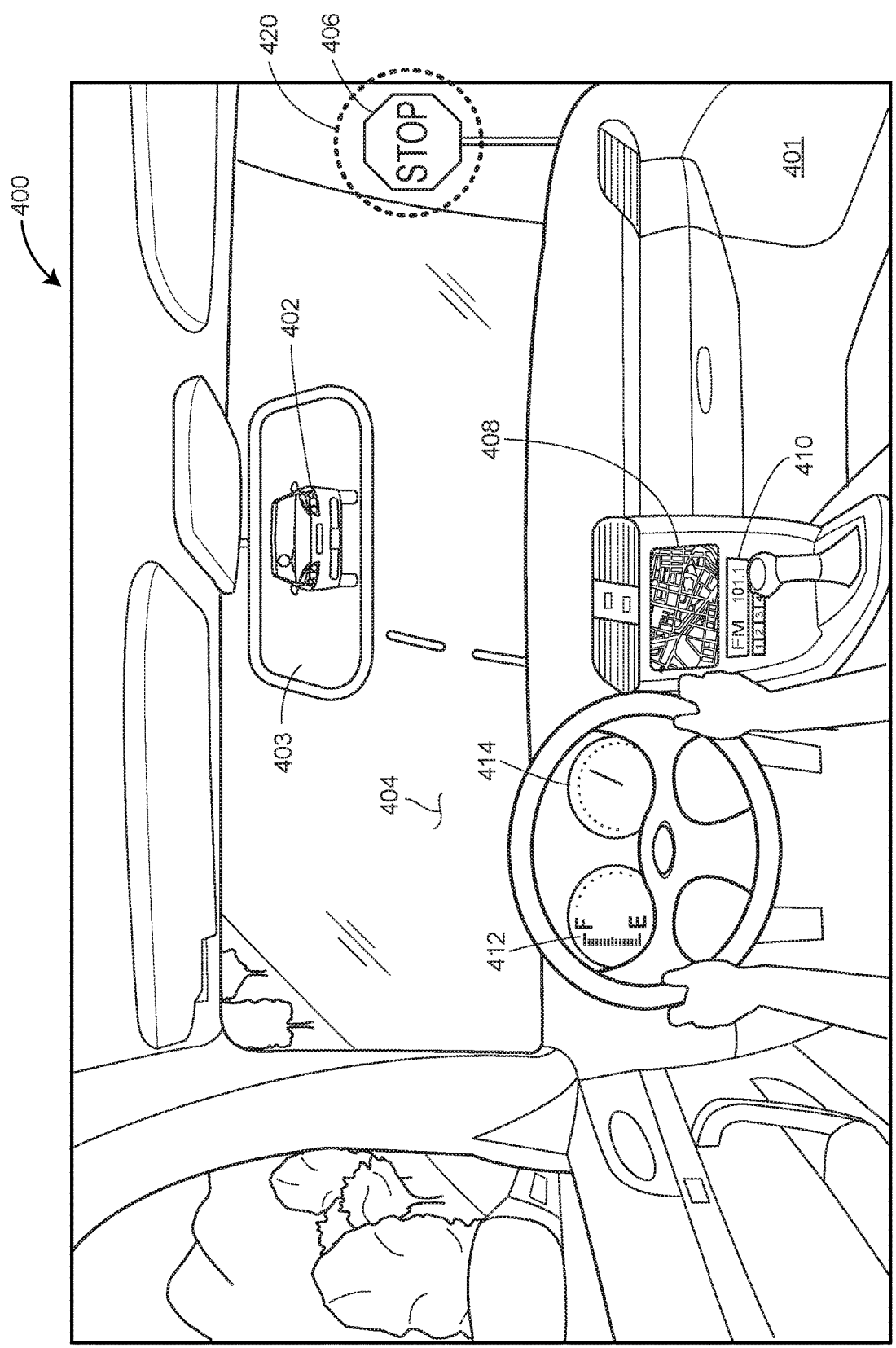
FIG. 4 is an illustration of one embodiment of a display rendered to a user during an instructional lesson of a virtual reality driving simulation in accordance with principles of the present disclosure.

In some embodiments, the instructional lesson may display a virtual environment that is similar to or exactly the same as the virtual environment to be displayed later during the practice driving scenario. For example, as illustrated in FIG. 4, the instructional lesson may include a virtual rendering of what it looks like to approach a stop sign from a user's point-of-view under real-life conditions. The instructional lesson may further include audio and/or text stating: "You must stop at a stop sign posted at an intersection. Also, before proceeding through the intersection, you should look both to the right and your left." Additionally, the instructional lesson may include a visual cue 420 identifying (e.g., highlighting or emphasizing) a relevant aspect of the displayed driving scenario. In the embodiment depicted in FIG. 4, the visual cue 420 is an exogenous cue which is superimposed on the driving scenario as a bright-colored outline surrounding the stop sign 406. The visual cue 420, however, is not limited to an outline, and may additionally or alternatively include arrows, symbols, color changes, sounds, text, motion, etc., or any suitable combination thereof. In some embodiments, the visual cue 420 may function as an exogenous cue by automatically drawing the user's attention to an aspect of the driving scenario, with little or no interpretation required on behalf of the user to understand the meaning of the cue. Exogenous cues include, but are not limited to, bright lights, flashing, motion, temporal offsets, color changes, sudden sounds, etc. In other embodiments, the visual cue 420 may function as an endogenous cue by requiring at least some interpretation on behalf of the user to understand the meaning of the cue. Endogenous cues include, but are not limited to, text, arrows, text, etc.

Subsequently, when the driving scenario is rendered for the user to practice the rules and/or skills from the instructional lesson, the virtual environment for the driving scenario may be the exact same as the one rendered during the instructional lesson, except that the instructional audio/text and visual cue(s) may be omitted (see FIG. 5). Accordingly, the same cognitive mechanisms and behavior elicited in the learning environment may be employed by the user in the practice environment, and also later in a real-world environment. It has been found that this aspect of the driver training improves knowledge transfer and skill acquisition.

While the virtual reality driving simulation is being rendered, one or more of the client devices 136-144 may simultaneously record user performance data. In some embodiments, the computer 138 may cause the VR device 142 to render the virtual reality driving simulation and also simultaneously cause the VR device 142 (e.g., via the MS device 144) to record user performance data representative of movement of the user's head and/or eyes during at least the practice driving scenario portion of the virtual reality driving simulation. Additionally, or alternatively, the computer 138 may cause the steering wheel 140 to record user performance data representative of, for example, the user's turning speed, and cause the pedals 141 to record user performance data representative of, for example, the user's acceleration and/or deceleration, during at least the practice driving scenario portion of the virtual reality driving simulation. Additionally, or alternatively, the computer 138 may cause the HTU 136 to record user performance data representative of, for example, movement of one or more of the user's head, arms, hands, torso, or any other portion of the user's body during at least the practice driving scenario portion of the virtual reality driving simulation. Additionally, or alternatively, the computer 138 may cause the physiological sensor 143 to record user performance data representative of, for example, the heart rate of the user, the breathing rate of the user, the body temperature of the user, and/or the blood pressure of the user during at least the practice driving scenario portion of the virtual reality driving simulation.

It is noted that although the system 100 of the present embodiment comprises the client devices 136-144, the system 100 may include other client devices to render the simulation and/or record user performance data. For example the computer 138 may also implement a keyboard, monitor, mouse, voice recorder, etc. to render the simulation and/or record user performance data, or even may even utilize another computer to improve performance.

Once the virtual reality drive simulation is complete, the user performance data may be transmitted, via the computer network 106, to the backend components 104 for analysis (see FIG. 3 at block 308). The recorded user performance data may then be analyzed data to determine a driving competency score, as described above with respect to block 210 of FIG. 2. In some embodiments, this analysis may be performed by the computer 138 and/or one or more of the other client devices 136 and 140-144. In some embodiments, the user performance data representative of the movement of the user's head and/or eyes may be analyzed to determine if the user was looking at an appropriate object (e.g., the stop sign 406 shown in FIGS. 5 and 6) at an appropriate moment in time during the driving scenario (e.g., when the vehicle was within 200 feet of the stop sign 406). This object may be the one that was previously emphasized or highlighted with the visual cue 420 during the instructional lesson. If the analysis of the user performance data reveals that the user did not move their eyes and/or head to look at this object at the appropriate moment in time during the driving scenario, the user may receive a lower driving competency score (e.g., lower than the predetermined threshold). This type of driver training may be referred to as "gaze training."

Subsequently, one or more of the client devices 136-144 may receive, via the computer network 106, user feedback based on the driving competency score (see FIG. 3 at block 310). Examples of the types of user feedback that may be received by the one or more client devices 136-144 are described above in connection with blocks 216-220 of FIG. 2.

If the driving competency score is above or equal to a predetermined threshold, the first type of user feedback may be provided. In some embodiments, the first type of user feedback may include positive reinforcement for the user including, for example, praise and/or a reward (e.g., the ability to upgrade the make or model of the vehicle being rendered by the virtual reality driving simulation). Additionally, or alternatively, the first type of user feedback may include an updated virtual reality driving simulation including, at least, displaying images on the stereoscopic display of the VR device 142 and/or emitting audio through one or more speakers incorporated into the VR device 142. In some embodiments, the images and/or audio of the updated virtual reality driving simulation may include both: (i) an updated instructional lesson for teaching additional driving-related rules and/or skills to the user, and (ii) an updated driving scenario for the user to practice the additional driving-related rules and/or skills taught by the updated instructional lesson. The user may manipulate the steering wheel 140, pedals 141, and/or other controls when practicing the additional driving-related rules and/or skills during the updated driving scenario portion of the updated virtual reality driving simulation. Accordingly, the updated virtual reality driving simulation is adapted to reflect the user's proficiency with the initial set of driving-related rules and/or skills.

If the driving competency score is below a predetermined threshold, the second type of user feedback may be provided. In some embodiments, the second type of user feedback may notify the user of their inadequate driving competency score and/or provide encouragement and/or tips for improving their score. Additionally, or alternatively, the first type of user feedback may include an updated virtual reality driving simulation including, at least, displaying images on the stereoscopic display of the VR device 142 and/or emitting audio through one or more speakers incorporated into the VR device 142. In some embodiments, the images and/or audio of the updated virtual reality driving simulation may include both: (i) an updated instructional lesson for re-teaching the driving-related rules and/or skills to the user, and (ii) an updated driving scenario for the user to practice the driving-related rules and/or skills taught by the updated instructional lesson. The user may manipulate the steering wheel 140, pedals 141, and/or other controls when practicing the additional driving-related rules and/or skills during the updated driving scenario portion of the updated virtual reality driving simulation. While the updated virtual reality driving simulation is being rendered, one or more of the client devices 136-144 may simultaneously record user performance data, in a manner similar to that discussed above. Accordingly, the updated virtual reality driving simulation is adapted to ensure that the user acquires proficiency with the initial set of driving-related rules and/or skills before moving on to other driving-related rules and/or skills.

While the updated virtual reality driving simulations described above are being rendered, one or more of the client devices 136-144 may simultaneously record user performance data. This process may be similar to the recording process described above with respect to the initial virtual reality driving simulation.

After the updated virtual reality drive simulation is complete, the user performance data (recorded during block 312 of FIG. 3) may be transmitted, via the computer network 106, to the backend components 104 for analysis (see FIG. 3 at block 314). The recorded user performance data may then be analyzed data to determine an updated driving competency score, as described above with respect to block 210 of FIG. 2. In some embodiments, this analysis may be performed by the computer 138 and/or one or more of the other client devices 136 and 140-144.

Finally, the method 300 may involve determining whether any and all virtual reality driving simulations are complete (see FIG. 3 at block 316). If not, the method 300 may return to block 310 shown in FIG. 3, such that the one or more client devices 136-144 may receive additional feedback, via the computer network 106, and subsequently may repeat the steps represented by blocks 310-316 of FIG. 3.

III. Example Displays for Driving Simulation

FIG. 4 is an example display 400 for an instructional lesson included as part of a virtual reality driving simulation, including, for example, the virtual reality driving simulations described above. In some embodiments, the display 400 may be rendered in virtual reality by the VR device 142 worn by the user during the virtual reality driving simulation. In other embodiments, the display 400 may be rendered on a monitor of the computer 138, for example.

Although illustrated as a stationary image, the display 400 may be part of a sequence of images representing a 360 degree, three-dimensional interactive virtual environment for the user. The VR device 142 may be configured to make the display 400 interactive for the user. For example, if the user wearing the VR device 142 were to turn to their head to the left, the display 400 would change to show the elements to the left of the display 400 shown in FIG. 4. In this example, the driver in the display 400 would turn to the left and see outside the driver-side window (including, for example, an interactive side view mirror). Accordingly, an immersive experience that realistically simulates real-life driving may be provided by the VR device 142. Furthermore, the immersive experience provided by the VR device 142 can make instructional lessons more effective by successfully simulating dangerous conditions such as fog, high speeds, and near collisions, etc., all without putting the driver in real danger.

In general, the display 400 shown in FIG. 4 is intended to replicate real-life driving conditions from the perspective of a driver operating a vehicle. However, as described below in more detail, because the display 400 is part of the instructional lesson portion of the virtual reality driving simulation, instructional text and/or audio as well as visual cues may be included in the display 400 that would otherwise not exist in real-life conditions.

The display 400 may include one or more features corresponding to the one or more input parameters. For example, the display 400 may include a vehicle 401 corresponding to the type of vehicle specified by the one or more input parameters. The vehicle 401 may include a car with a steering wheel on the left hand side, a car with the steering wheel on the right hand side, a truck, a motorcycle, plane, boat, watercraft, heavy machinery, forklift, etc. The vehicle 401 may also correspond to the make, year, and/or model of the vehicle owned by the user in real-life.

The variability of the vehicle 401 may provide the virtual reality driving simulation with added realism. For example, if the selected vehicle is a sports car, the simulation may have the look and feel of a sports car. Similarly, if the selected vehicle 401 is a truck, motorcycle, van, etc. the simulation may be adjusted accordingly. The simulator module 112 may achieve this by choosing displays and controls based on the selected vehicle 401. For example, the simulation module 112 may generate a display for the steering wheel, radio, mirrors, speedometer, fuel meter, etc. according to the design layout and/or specifications of a vehicle 401 selected by the one or more input parameters. The above exemplary display elements are intended as an example and are not intended to limit the scope of the elements that can be displayed according to a vehicle's specifications.

In some embodiments, the simulator module 112 may adjust various control elements of the virtual reality driving simulation according to the selected vehicle 401. For example, the simulator module 112 may adjust the vehicle acceleration, turning radius, braking speed, visibility, height, etc. of the simulation based on the vehicle 401. Accordingly, this may provide added realism by adjusting the control of the vehicle according to the real-life control and/or handling of the vehicle. The above exemplary control elements are intended as an example and are not intended to limit the scope of the control elements that can be adjusted according to the vehicle's specifications.

In some embodiments, additional vehicles 402 may be included in the display 400. In some embodiments, the additional vehicles 402 may be computer-generated obstacles to be used in assessing the user's ability to comply with the driving-related rules and/or skills. In other embodiments, the additional vehicles 402 may correspond to one or more drivers executing the same simulation in the computer network. For example, one or more groups of client devices may execute the simulation concurrently. In turn, each vehicle rendered in the simulation may represent one group of client devices executing the virtual reality driving simulation. Multiple drivers may implement one or more groups of client devices to execute the simulation as part of driving education class activity and/or as a group of individuals performing the simulation in a "multi-player" mode.

The display 400 may also include interactive rearview mirrors 403. The rearview mirrors 403 may be adjusted by the driver during the simulation. Although only one rearview mirror 403 is included in the display 400, the virtual reality driving simulation may include multiple rearview mirrors 403 and/or side view mirrors. Additionally, the display 400 may include a simulated rearview camera screen as part of the display 400.

The display 400 may include one or more roads 404 capable of being traversed by the vehicle 401. In some embodiments, the roads 404 may correspond to real-life roads; whereas in other embodiments the roads 404 may be computer-generated and tailored to demonstrate certain driving-related rules and/or skills. In some embodiments, the roads 404 may be imported from an external service (e.g., Google® maps) as specified by the one or more input parameters. Accordingly, the virtual reality driving simulation may be able to provide the user with a realistic experience of driving in a real-life location. In some embodiments, the roads 404 may contain various obstacles and/or features specified by the input parameters or other information. Markers 406 corresponding to various traffic signs (e.g., speed limit signs, stop signs, caution signs, one-way signs, dead end signs, parking signs, caution signs, etc.), street lights, and other roadway informational objects may be rendered alongside, above, and/or on the road 404. In the illustrated embodiment, the marker 406 is a stop sign. In some embodiments, the markers 406 may correspond to those specified by the one or more input parameters.

The display 400 may further include a map 408 of the roads 404 rendered in the virtual reality driving simulation. In some embodiments, the map 408 may replicate the screen of a GPS device built-into the vehicle 401. The display 400 may also include an interactive radio 410, a fuel indicator 412, and/or a speedometer 414.

As mentioned above, the display 400 may be rendered during the instructional lesson portion of the virtual reality driving simulation. As such, the display 400 may be superimposed with instructional text (not illustrated) and/or visual cues 420 (e.g., exogenous cues and/or endogenous cues) for teaching driving-related rules and/or skills to the user. For example, the instructional text may state that: "You must stop at a stop sign posted at an intersection. Also, before proceeding through the intersection, you should look both to the right and your left." Simultaneous with the display of the instructional text, audio of a narrator speaking the text may be provided to the user via speakers built into the VR device 142.

The visual cues 420 may identify (e.g., highlight or emphasize) relevant aspects (e.g., road signs, traffic lights, road features such as intersections, obstacles, pedestrians, etc.) of the driving scenario shown by the display 400. In the illustrated embodiment, the visual cue 420 calls attention to the stop sign 406 by providing a bright-colored outline around the stop sign 406. The visual cue 420, however, is not limited to an outline, and may additionally or alternatively include arrows, symbols, color changes, sounds, text, etc., or any suitable combination thereof. In some embodiments, the visual cue 420 may be intended to cause the user to move her head and/or eyes to look at the visual cue 420 so that the user gets in the habit of looking at or directed their attention to identifying the traffic signs, obstacles, etc. emphasized by the visual cue 420.

Figure 5:
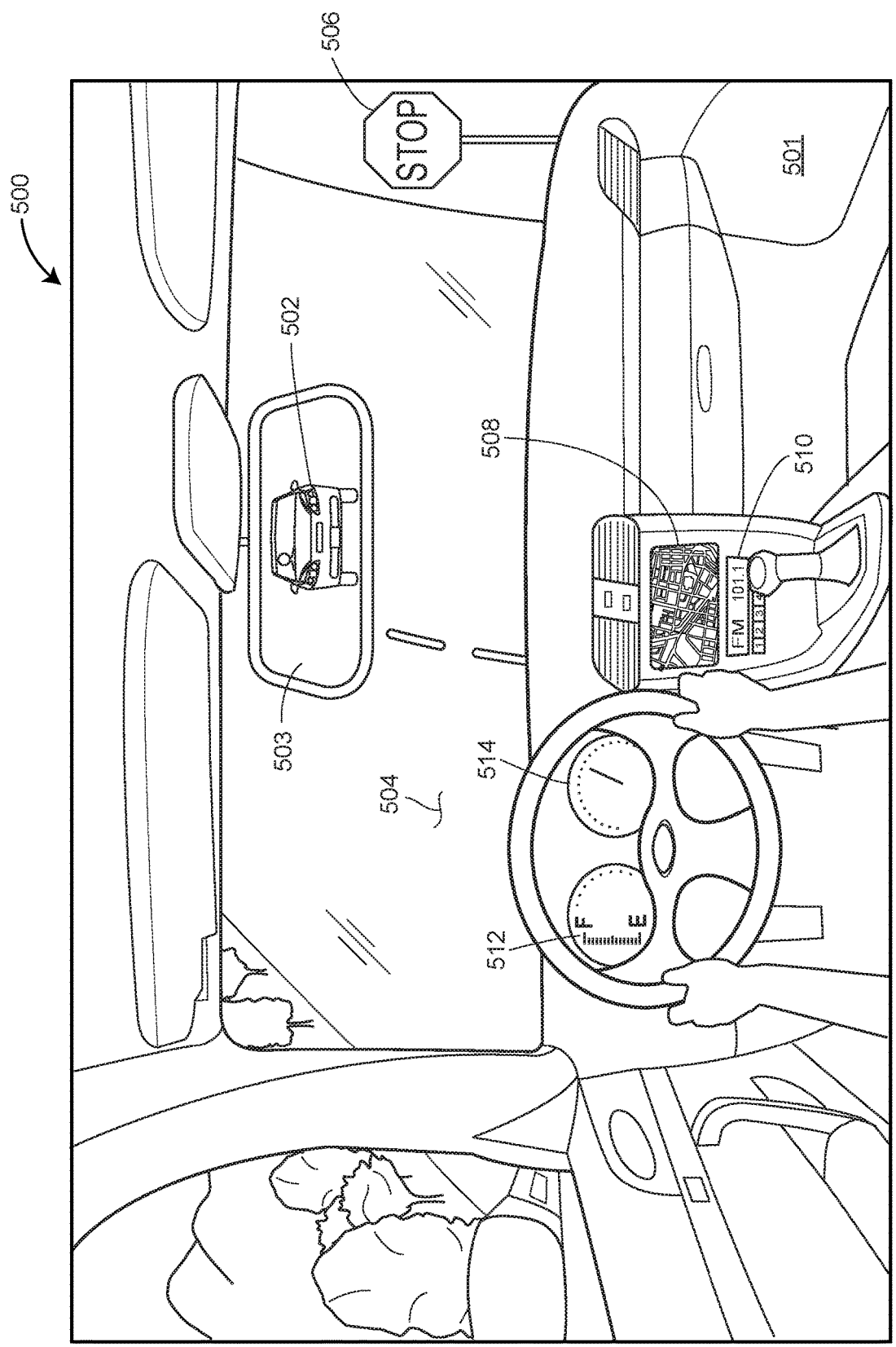
FIG. 5 is an illustration of one embodiment of a display rendered to a user during a practice driving scenario of a virtual reality driving simulation in accordance with principles of the present disclosure.

Turning to FIG. 5, an example display 500 for a driving scenario to be rendered as part of a virtual reality driving simulation after the instructional lesson corresponding to the display 400 has been rendered. The display 500 may be the same as the display 400, except that any instructional text and/or visual cues 420 included as part of the display 400 are omitted from the display 500. Elements of the display 500 which are the same as the display 400 are designated by the same reference numeral, incremented by 100. A description of many of these elements is abbreviated or even eliminated in the interest of brevity.

In general, the display 500 shown in FIG. 5 is intended to replicate real-life driving scenario for the user to practice the driving-related rules and/or skills taught during the instructional lesson portion of a virtual reality driving simulation corresponding to the display 400 of FIG. 4. The manner in which the user reacts to the driving scenario may be recorded as part of the user performance data, as described previously. The user performance data subsequently may be analyzed to determine a driving competency score and appropriate feedback may be provided to the user, as described above.

Because the driving scenario provided by the display 500 is identical or nearly identical to the driving scenario of the display 400, the same cognitive mechanisms and behavior elicited in the learning environment may be employed by the user in the practice environment. It has been found that this aspect of the driver training improves knowledge transfer and skill acquisition. Accordingly, the presently disclosed driving training methods and systems may better prepare a user or student for real-life driving scenarios.

IV. Example Configuration

Figure 6:
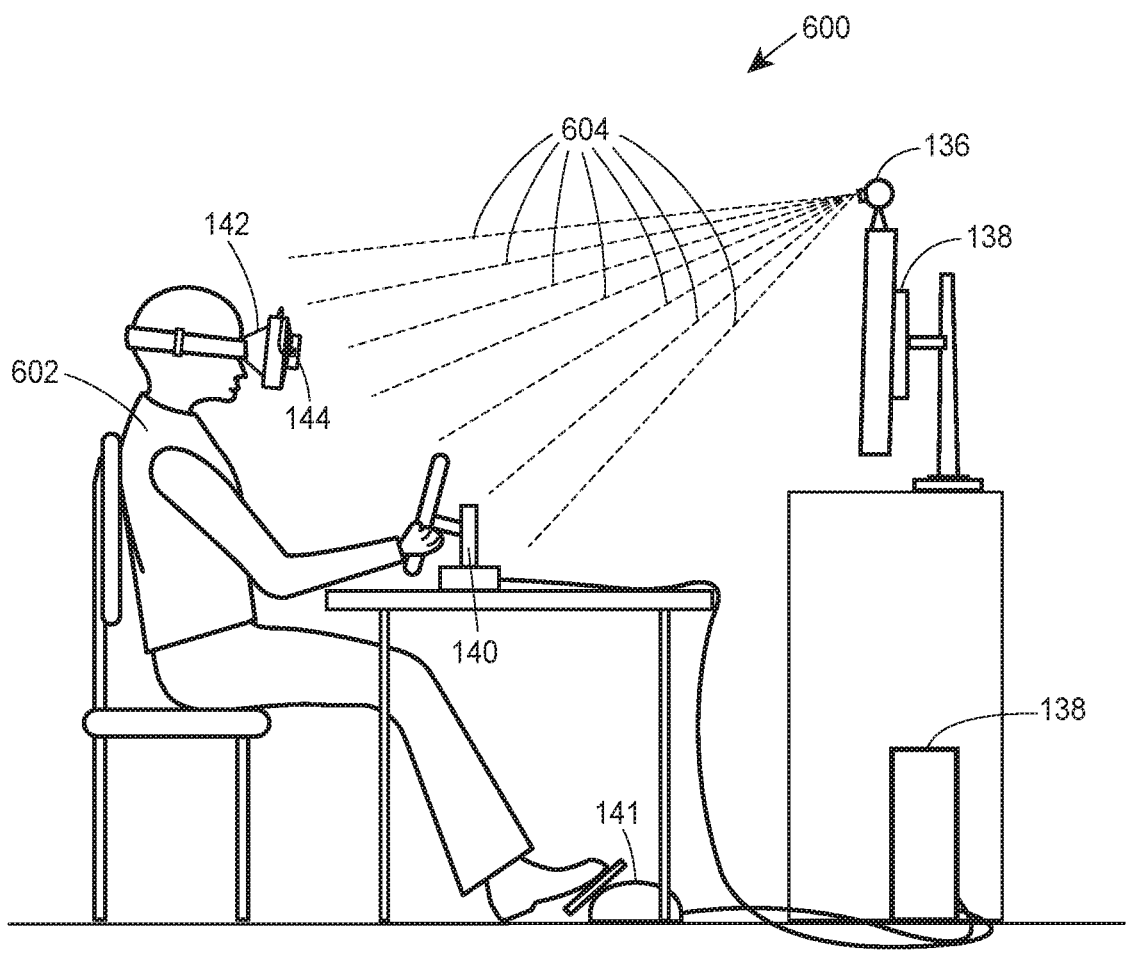
FIG. 6 is an illustration of one embodiment of a configuration of a virtual reality driving simulator in use.

FIG. 6 is an example configuration 600 of the front-end components of the system 100 and a user 602 during execution of the virtual reality driving simulation. Although the client devices 136-144 are shown to be connected via a wired connection, in other embodiments any combination of the client devices can be connected via a wired and/or wireless connection.

The configuration 600 is organized so that the HTU 136 may record the user 602 while the user 602 wears the VR device 142 (including the physiological device and the MS device 144) and manipulates the steering wheel 140 and the pedals 141. The configuration 600 is intended for illustrative purposes only and the client devices 136-144 can be configured in any suitable manner. The configuration 600 may be customizable based on the size and/or layout of an area where the client devices 136-144 are set up. Furthermore, it is noted that the configuration 600 may include additional client devices that are not pictured, such as video game controllers, a stick shift device, speakers, a mouse, key board etc.

The HTU 136 can be a video recording device, for example, and may record the movement of the user 602 throughout execution of the virtual reality driving simulation. Sight-lines 604 indicate a field-of-view of the HTU 136. In some embodiments, the HTU 136 may only record movement of the user's torso, arms, and head. The movements recorded by the HTU 136 during the virtual reality driving simulation may be transmitted as part of user performance data, as described above.

The VR device 142 and/or the MS device 144 may also record the user's head movements and/or eye movements throughout the execution of the virtual reality driving simulation. The user's body and/or eye movements can be used to determine part of the driving competency score. If the user's body movements are too quick or do not correspond correctly to elements of the virtual reality driving simulation, the user may receive a lower driving competency score. For example, if the user's eye and/or movements indicate that the user does not look at an object include in the practice driving scenario that was previously emphasized with the visual cue 420 during the instructional lesson, the user may receive a lower driving competency score.

The steering wheel 140 and/or pedals 141 may also be utilized to record user performance data throughout the execution of the virtual reality driving simulation. In some embodiments, the computer 138 may record the user performance data transmitted from the steering wheel 140 and/or pedals 141. The steering wheel 140 can detect how and when the user turns the simulated vehicle, and the pedals 141 may detect how the user accelerates, decelerates (e.g., brakes) the simulated vehicle. The user performance data representative of operation of the steering wheel 140 and/or pedals 141 may also be used as part of the determination of the driving competency score. If the user does not appropriately implement the steering wheel 140 and/or pedals 141 throughout execution of the virtual reality driving simulation, the user may receive a lower driving competency score.

V. Additional Considerations

The following additional considerations apply to the foregoing discussion. Throughout this specification, plural instances may implement functions, components, operations, or structures described as a single instance. Although individual functions and instructions of one or more methods are illustrated and described as separate operations, one or more of the individual operations may be performed concurrently, and nothing requires that the operations be performed in the order illustrated. Structures and functionality presented as separate components in exemplary configurations may be implemented as a combined structure or component. Similarly, structures and functionality presented as a single component may be implemented as separate components. These and other variations, modifications, additions, and improvements fall within the scope of the subject matter herein.

For example, the network 106, may include, but is not limited to, any combination of a LAN, a MAN, a WAN, a mobile, a wired or wireless network, a private network, or a virtual private network. Moreover, it is understood that any number of client computers or display devices are supported and may be in communication with the data system 104.

Additionally, certain embodiments are described herein as including logic or a number of functions, components, modules, blocks, or mechanisms. Functions may constitute either software modules (e.g., non-transitory code stored on a tangible machine-readable storage medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain functions. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, which may be one of an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules may provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and may operate on a resource (e.g., a collection of information).

The various operations of exemplary functions and methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some exemplary embodiments, comprise processor-implemented modules.

Similarly, the methods or functions described herein may be at least partially processor-implemented. For example, at least some of the functions of a method may be performed by one or more processors or processor-implemented hardware modules. The performance of certain of the functions may be distributed among the one or more processors, not only residing within a single machine, but deployed across a number of machines. In some exemplary embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the functions may be performed by a group of computers (as examples of machines including processors). These operations are accessible via a network (e.g., the Internet) and via one or more appropriate interfaces (e.g., application program interfaces (APIs)).

The performance of certain operations may be distributed among the one or more processors, not only residing within a single machine, but deployed across a number of machines. In some exemplary embodiments, the one or more processors or processor-implemented modules may be located in a single geographic location (e.g., within a home environment, an office environment, or a server farm). In other exemplary embodiments, the one or more processors or processor-implemented modules may be distributed across a number of geographic locations.

Some portions of this specification are presented in terms of algorithms or symbolic representations of operations on data and data structures stored as bits or binary digital signals within a machine memory (e.g., a computer memory). These algorithms or symbolic representations are examples of techniques used by those of ordinary skill in the data processing arts to convey the substance of their work to others skilled in the art. As used herein, a "function" or an "algorithm" or a "routine" is a self-consistent sequence of operations or similar processing leading to a desired result. In this context, functions, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a function, process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a computer system 100 for purposes of illustration only. One of ordinary skill in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and method for providing a driving simulator on a mobile device through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The patent claims at the end of this patent application are not intended to be construed under 35 U.S.C. § 112(f) unless traditional means-plus-function language is expressly recited, such as "means for" or "step for" language being explicitly recited in the claim(s).

What is claimed is:

1. A computer-implemented method for driver training, comprising:
    receiving, via a computer network, at least one input parameter corresponding to at least one feature to be rendered during a virtual reality driving simulation;
    determining, by one or more processors, the virtual reality driving simulation based on the at least one input parameter, wherein the virtual reality driving simulation comprises: (i) an instructional lesson, to be rendered in virtual reality, for teaching driving-related rules and/or skills to a user, and (ii) a driving scenario, to be rendered in virtual reality immediately after the instructional lesson, for the user to practice the driving-related rules and/or skills taught by the instructional lesson, wherein the instructional lesson comprises displaying at least a portion of the driving scenario used for practice in combination with information for teaching the driving-related rules and/or skills, wherein the at least a portion of the driving scenario displayed during the instructional lesson comprises rendering an environment from a point-of-view of a driver, and wherein the at least a portion of the driving scenario displayed during the instructional lesson is visually identical to the at least a portion of the driving scenario used for practice except that the at least a portion of the driving scenario used for practice does not display the information for teaching the driving-related rules and/or skills;
    transmitting, via the computer network, the virtual reality driving simulation for execution on at least one head-mounted virtual reality device;
    receiving, via the computer network, user performance data recorded during execution of the virtual reality driving simulation; and
    analyzing, by the one or more processors, the user performance data to determine a driving competency score, wherein the driving competency score measures user compliance with the driving-related rules and/or skills during the driving scenario of the virtual reality driving simulation.

2. The computer-implemented method of claim 1, comprising generating, by the one or more processors, feedback based on the driving competency score.

3. The computer-implemented method of claim 2, comprising transmitting, via the computer network, the feedback for execution on the at least one head-mounted virtual reality device.

4. The computer-implemented method of claim 3, comprising:
    comparing, by the one or more processors, the driving competency score to a predetermined threshold; and
    if the driving competency score is below the predetermined threshold, generating the feedback to include at least: (i) an updated instructional lesson, to be rendered in virtual reality, for re-teaching the driving-related rules and/or skills to the user, and (ii) an updated driving scenario, to be rendered in virtual reality, for the user to practice the driving-related rules and/or skills taught by the updated instructional lesson.

5. The computer-implemented method of claim 3, comprising:
    comparing, by the one or more processors, the driving competency score to a predetermined threshold; and
    if the driving competency score is equal to or above the predetermined threshold, generating the feedback to include at least: (i) an updated instructional lesson, to be rendered in virtual reality, for teaching additional driving-related rules and/or skills to the user, and (ii) an updated driving scenario, to be rendered in virtual reality, for the user to practice the additional driving-related rules and/or skills taught by the updated instructional lesson.

6. The computer-implemented method of claim 1, wherein the user performance data is representative of at least one of: controls operated by the user during the virtual reality driving simulation, movement of a head of the user during the virtual reality driving simulation, movement of one or more eyes of the user during the virtual reality driving simulation, movement of one or more arms of the user during the virtual reality driving simulation, movement of one or more hands of the user during the virtual reality driving simulation, movement of a torso of the user during the virtual reality driving simulation, a heart rate of the user during the virtual reality driving simulation, a blood pressure of the user during the virtual reality driving simulation, a body temperature of the user during the virtual reality driving simulation, or a breathing characteristic of the user during the virtual reality driving simulation.

7. The computer-implemented method of claim 1, wherein information for teaching the driving-related rules and/or skills comprises a visual cue superimposed on and identifying an aspect of the at least a portion of the driving scenario.

8. A computer-implemented method for driver training, comprising:
    receiving, via one or more client devices, at least one input parameter corresponding to at least one feature to be rendered during a virtual reality driving simulation, wherein the one or more client devices includes a head-mounted virtual reality device;
    transmitting, via a computer network, the at least one input parameter;

receiving, via the computer network, a particular virtual reality driving simulation based on the at least one input parameter;

executing, via the one or more client devices, the virtual reality driving simulation such that the head-mounted virtual reality device renders at least: (i) an instructional lesson for teaching driving-related rules and/or skills to a user, and (ii) immediately after rendering the instructional lesson, a driving scenario for the user to practice the driving-related rules and/or skills taught by the instructional lesson, wherein the instructional lesson comprises displaying at least a portion of the driving scenario used for practice in combination with information for teaching the driving-related rules and/or skills, wherein the at least a portion of the driving scenario displayed during the instructional lesson comprises rendering an environment from a point-of-view of a driver, and wherein the at least a portion of the driving scenario displayed during the instructional lesson is visually identical to the at least a portion of the driving scenario used for practice except that the at least a portion of the driving scenario used for practice does not display the information for teaching the driving-related rules and/or skills; and recording, via the one or more client devices, user performance data during execution of the virtual reality driving simulation.

9. The computer-implemented method of claim 8, comprising:

transmitting, via the one or more client devices, the user performance data; and receiving, via the one or more client devices, feedback based on a driving competency score, wherein the driving competency score measures user compliance with the driving-related rules and/or skills during the driving scenario of the virtual reality driving simulation.

10. The computer-implemented method of claim 9, comprising executing, via the one or more client devices, the feedback such that, if the driving competency score is below a predetermined threshold, the head-mounted virtual reality device renders at least: (i) an updated instructional lesson for re-teaching the driving-related rules and/or skills to the user, and (ii) an updated driving scenario for the user to practice the driving-related rules and/or skills taught during the updated instructional lesson.

11. The computer-implemented method of claim 10, comprising executing, via the one or more client devices, the feedback such that, if the driving competency score is equal to or above a predetermined threshold, the head-mounted virtual reality device renders at least: (i) an updated instructional lesson for teaching additional driving-related rules and/or skills to the user, and (ii) an updated driving scenario for the user to practice the additional driving-related rules and/or skills taught during the updated instructional lesson.

12. The computer-implemented method of claim 8, wherein the user performance data is representative of at least one of: controls operated by the user during the virtual reality driving simulation, movement of a head of the user during the virtual reality driving simulation, movement of one or more eyes of the user during the virtual reality driving simulation, movement of one or more arms of the user during the virtual reality driving simulation, movement of one or more hands of the user during the virtual reality driving simulation, movement of a torso of the user during the virtual reality driving simulation, a heart rate of the user during the virtual reality driving simulation, a blood pressure of the user during the virtual reality driving simulation, a body temperature of the user during the virtual reality driving simulation, or a breathing characteristic of the user during the virtual reality driving simulation.

13. A system for driver training, comprising:

one or more processors;

a head-mounted virtual reality display device; and a non-transitory computer-readable medium storing instructions that, when executed by the one or more processors, cause the system to:

receive at least one input parameter corresponding to at least one feature to be rendered during a virtual reality driving simulation, transmit the at least one input parameter, receive a particular virtual reality driving simulation based on the at least one input parameter, execute the virtual reality driving simulation such that the head-mounted virtual reality device renders at least: (i) an instructional lesson for teaching driving-related rules and/or skills to the user, and (ii) immediately after rendering the instructional lesson, a driving scenario for the user to practice the driving-related rules and/or skills taught by the instructional lesson, wherein the instructional lesson comprises displaying at least a portion of the driving scenario used for practice in combination with information for teaching the driving-related rules and/or skills, wherein the at least a portion of the driving scenario displayed during the instructional lesson comprises rendering an environment from a point-of-view of a driver, and wherein the at least a portion of the driving scenario displayed during the instructional lesson is visually identical to the at least a portion of the driving scenario used for practice except that the at least a portion of the driving scenario used for practice does not display the information for teaching the driving-related rules and/or skills, and record user performance data during execution of the virtual reality driving simulation.

14. The system of claim 13, the non-transitory computer-readable medium storing instructions that, when executed by the one or more processors, cause the system to receive feedback based on a driving competency score, wherein the driving competency score measures user compliance with the driving-related rules and/or skills during the driving scenario of the virtual reality driving simulation.

15. The system of claim 14, the non-transitory computer-readable medium storing instructions that, when executed by the one or more processors, cause the system to execute the feedback such that, if the driving competency score is below a predetermined threshold, the head-mounted virtual reality device renders at least: (i) an updated instructional lesson for re-teaching the driving-related rules and/or skills to the user, and (ii) an updated driving scenario for the user to practice the driving-related rules and/or skills taught during the updated instructional lesson.

16. The system of claim 14, the non-transitory computer-readable medium storing instructions that, when executed by the one or more processors, cause the system to execute the feedback such that, if the driving competency score is equal to or above a predetermined threshold, the head-mounted virtual reality device renders at least: (i) an updated instructional lesson for teaching additional driving-related rules and/or skills to the user, and (ii) an updated driving scenario for the user to practice the additional driving-related rules and/or skills taught during the updated instructional lesson.

17. The system of claim 13, wherein the information for teaching the driving-related rules and/or skills comprises a visual cue superimposed on and identifying an aspect of the at least a portion of the driving scenario.

18. The computer-implemented method of claim 1, wherein an amount of time between the instructional lesson and the driving scenario is within a range of 0-5 seconds.

19. The computer-implemented method of claim 8, wherein an amount of time between the instructional lesson and the driving scenario is within a range of 0-5 seconds.

20. The system of claim 13, wherein an amount of time between the instructional lesson and the driving scenario is within a range of 0-5 seconds.

\* \* \* \* \*